(12) United States Patent
Schelinski

(10) Patent No.: US 6,818,055 B2
(45) Date of Patent: Nov. 16, 2004

(54) POROUS SILICATE GRANULAR MATERIAL AND METHOD FOR PRODUCING IT

(75) Inventor: Siegfried Schelinski, Weisswasser (DE)

(73) Assignee: Mattig & Lindner GmbH, Forst (DE)

( * ) Notice: Subject to any disclaimer, the term of this patent is extended or adjusted under 35 U.S.C. 154(b) by 189 days.

(21) Appl. No.: 09/931,126

(22) Filed: Aug. 16, 2001

(65) Prior Publication Data
US 2002/0073898 A1 Jun. 20, 2002

(30) Foreign Application Priority Data
Aug. 16, 2000 (DE) .......................................... 100 42 071

(51) Int. Cl.$^7$ .............................................. C04B 14/04
(52) U.S. Cl. ...................... 106/600; 106/601; 106/605; 106/737
(58) Field of Search .............................. 106/600, 601, 106/605, 737

(56) References Cited

U.S. PATENT DOCUMENTS

| | | | |
|---|---|---|---|
| 3,443,920 A | | 5/1969 | Overcashier et al. |
| 3,814,614 A | * | 6/1974 | Kramer et al. |
| 3,942,990 A | | 3/1976 | Engstrom et al. |
| 3,990,901 A | | 11/1976 | Engstrom et al. |
| 4,552,577 A | | 11/1985 | Varshneya et al. |
| 4,693,739 A | | 9/1987 | Manabe et al. |

FOREIGN PATENT DOCUMENTS

| | | |
|---|---|---|
| DE | 1 496 684 | 7/1969 |
| DE | 1 496 669 | 10/1969 |
| DE | 1 905 340 | 8/1970 |
| DE | 2 335 146 | 1/1974 |
| DE | 35 22 291 | 1/1986 |
| DE | 198 36 869 | 2/2000 |
| FR | 1 592 183 | 6/1970 |
| GB | 1002786 | 8/1965 |
| GB | 1287687 | 9/1972 |

* cited by examiner

Primary Examiner—Paul Marcantoni
(74) Attorney, Agent, or Firm—Collard & Roe, P.C.

(57) ABSTRACT

A porous silicate granular material, especially as aggregate for the production of construction materials such as lightweight concrete, mortar or heat-insulating plaster containing glass and a glassy crystalline component comprising 45 to 85 wt. % $SiO_2$, 5 to 20 wt. % alkali oxide, 5 to 30 wt. % alkaline earth oxide and 2 to 30 wt. % of other oxides such as $Al_2O_3$ and/or $Fe_2O_3$. The glassy crystalline component accounts for 5 to 75 wt. % of the granular material. The glassy crystalline component of the granular material is a sinter reaction product. There is also a method of producing such a granular material in which the mixture is agglomerated at a temperature of 20° C. to 150° C. at normal pressure with the water vapour partial pressure being adjusted, selected or controlled as a function of time-temperature and carbon dioxide being excluded or admitted, whereby the admission of carbon dioxide is controlled by adjusting or selecting the carbon dioxide partial pressure.

15 Claims, No Drawings

POROUS SILICATE GRANULAR MATERIAL AND METHOD FOR PRODUCING IT

BACKGROUND OF THE INVENTION

1. Field of the Invention

The invention relates to a porous silicate granular material, especially as aggregate for the production of construction materials such as lightweight concrete, mortar or heat-insulating plaster containing glass and a glassy crystalline component comprising 45 to 85 wt. % $SiO_2$, 5 to 20 wt. % alkali oxide, 5 to 30 wt. % alkaline earth oxide and 2 to 30 wt. % of other oxides such as $Al_2O_3$ and/or $Fe_2O_3$, whereby the glassy crystalline component accounts for 5 to 75 wt. % of the granular material, and a method for producing such a granular material.

2. Description of the Related Art

Granular porous silicate construction materials or such materials occurring as granular material are used as aggregates for the production of lightweight concrete and lightweight mortars. In the production of close-grained and no-fines lightweight concretes these aggregates with their grain inherent strength and grain bulk density play a particular role. According to the prior art, grain inherent strengths and grain bulk densities can presently only be varied in certain ranges. For expanded glass granular material of grain group 4/8 mm for example, the grain strength based on DIN standard 4226, Part 3, is approximately 0.8 $N/mm^2$ with a grain bulk density of 250 to 350 $kg/m^3$. Corresponding pairs of values for expanded clays are: approximately 1.5 $N/mm^2$—550 to 650 $kg/m^3$, approximately 3.5 $N/mm^2$—700 to 800 $kg/m^3$ and approximately 5.3 $N/mm^2$—900 to 1000 $kg/m^3$.

DE 43 42 996 C2 discloses a method for producing foamed glass granular material as a lightweight aggregate from ground glass, binder and expanding agent. In this method recycled glass and additional components are mixed to a target composition containing (in wt. %) 68.5–75% $SiO_2$, 10–<14 $Na_2O$, up to 2.5% $K_2O$, 1.8–3% $Al_2O_3$, >6–11% CaO, 0.5–4% MgO, up to 0.5% $Fe_2O_3$, up to 0.4% $SO_3$, up to 1% $TiO_2$, 0.5–3% BaO and up to 0.5% other components, whereby the alkali oxide component is less than 15 wt. %. This mixture is ground and then mixed intimately with the binder and the expanding agent. The mixture is then formed into pressings by means of press rollers at pressures of >100 to 200 MPa and the pressings are finally crushed to form raw granular material and aerated in a heat treatment method using controlled temperature regimes.

DE 198 36 869 A1 describes a method for producing starting products for glass products, glass-like materials or materials containing glass components or glass phase, especially lightweight aggregate for producing lightweight concrete, whereby a mixture of alkali silicates and alkaline earth silicates or alkali silicates, alkaline earth silicates and complex alkali-alkaline earth silicates and the corresponding hydrogen silicates or silicate hydrates and quartz is used. This method is essentially characterised by the fact that alkali hydroxides and alkaline earth oxides and hydroxides are mixed with powdered quartz, fine-grained silicon dioxide or $SiO_2$-rich fine-grained materials with dissolving water or with the addition of water and if necessary with the addition of other raw or initial materials, especially glass powder, at temperatures between ambient temperature and 150° C. and as a mixture are subjected to heat treatment involving silicate and hydrogen silicate formation, agglomeration and drying at temperatures between 80° C. and 200° C. Also described in DE 198 36 869 A1 are mixtures of fine quartz sand and cement as parting compounds for a granular material during a melt sintering process and an expanding process in a rotary kiln at temperatures of 850° C. to 900° C.

DE 197 02 560 A1 discloses a method for utilising old glass from cathode ray tubes. In this method a raw granular material is first manufactured to produce foamed glass granular material by adding a suitable parting compound such as chalk, cement or quartz powder so that the individual grains do not stick together during the subsequent expanding and sintering process. However, the possibilities for the use of cement are not exhausted thereby.

The influence of the atmosphere during the production of raw granular materials and during the melt sintering and expanding processes is not taken into account in the documents DE 43 42 996 C2, DE 197 02 560 A1 and DE 198 36 869 A1. Thus, the relevant control possibilities are also not taken into account.

SUMMARY OF THE INVENTION

The object of the present invention is to make available aggregates as porous silicate granular material having a dense surface and a broad spectrum of grain bulk density with high grain inherent strength which allow the required properties of lightweight concrete in terms of strength, bulk density and construction physics to be adjusted over a wide range.

It was found that this object is solved by a granular material of the type specified initially if the glassy crystalline component is the sinter reaction product of a mixture of a) quartz powder and/or another essentially pure fine-grained $SiO_2$ carrier, b) powdered clay and/or powdered clay mineral, c) Portland cement, d) caustic soda and e) an expanding agent as at least one additive.

The method for producing the granular material according to the invention is essentially characterised by the fact that a mixture of a) powdered glass, b) quartz powder and/or another essentially pure fine-grained $SiO_2$ carrier, c) powdered clay and/or powdered clay mineral, d) Portland cement, e) caustic soda, f) an expanding agent and g) water and if necessary other additives and/or accessory agents is produced, the mixture is agglomerated at a temperature of 20° C. to 150° C. at normal pressure with the water vapour partial pressure being adjusted, selected or controlled as a function of time-temperature and carbon dioxide being excluded or admitted, whereby the admission of carbon dioxide is controlled by adjusting or selecting the carbon dioxide partial pressure, the intermediate product is crushed and graded if necessary, and the intermediate product thus obtained is heated at normal pressure with the carbon dioxide partial pressure and/or the water vapour partial pressure being adjusted, selected or controlled as a function of time-temperature, to a temperature of 700° C. to 1250° C. and sintered and expanded at this temperature.

The duration of the sintering and expanding process is usually between 5 minutes and 30 minutes.

The chemical composition of the glass component lies in the range of normal compositions of industrial bulk glasses, mainly the alkali-alkaline earth silicate glasses. The glassy crystalline component lies preferably in the composition range relative to mass of 45% to 85% $SiO_2$, 5% to 20% alkali oxide ($R_2O$), 5% to 30% alkaline earth oxide (RO), and 2% to 30% other oxides (such as $Al_2O_3$, $Pe_2O_3$).

Other objects and advantageous embodiments of the method will become apparent from a reading of the following detailed description and the appended claims.

DESCRIPTION OF THE PREFERRED EMBODIMENTS

A preferred embodiment of the method according to the invention consists in that powdered glass, powdered glass mixtures and/or powdered glass from contaminated yields of industrial bulk glasses and quartz powder or other almost pure fine-grained $SiO_2$ carriers with grain sizes of <40 μm are used.

For the method the mass fraction in the end product originating from additives and accessory agents is set to a maximum of 20 wt. %. In addition to expanding agents (swelling agents) and water, in the group of additives and accessory agents there are used individually or combined water glass solutions, filter dust, ground slag, powdered ceramic, quicklime, hydrated lime, powdered limestone, gypsum, anhydrite, powdered corundum, aluminium hydrate, other oxides, hydroxides, carbonates and sulphates of alkalis and alkaline earths, and other silicate, oxide, hydroxide, carbonate or sulphate materials.

Carbon or carbon carriers such as soot, powdered graphite, powdered coal, fine-grained silicon carbide and carbohydrate are preferably used as expanding agents. Commercially available sugar is well suited as carbohydrate. According to the invention, on the one hand the action of these expanding agents and on the other hand the thereby related reactions and melt sintering processes of the oxide constituents in the agglomerates occurring as intermediate products during heating to the sintering and expanding temperature and during the sintering and expansion themselves are controlled by adjusting, selecting or presetting as a function of time-temperature the carbon dioxide and water vapour partial pressure. The Boudouard equilibrium and the water gas reaction are used to control the expansion processes, which influence other redox processes, such as for example with the sulphate constituents brought in by the powdered glass and Portland cement.

For the production of glassy crystalline porous silicate granular materials the mixed initial materials must first be agglomerated. This agglomeration can be linked with reactions or pre-reactions which take place mainly between powdered glass, powdered quartz, clay constituents, Portland cement and caustic soda. Depending on the temperature, storage, drying or treatment time, water vapour partial pressure, material exchange or material transport conditions and additional initial dilution by water, silicates or silicate hydrates are formed between 20° C. and 150° C. which cement the initial materials and accelerate and control the sintering, melting and expansion processes taking place above approximately 700° C. The carbonate formation taking place in addition to the silicate and silicate hydrate formation during the pre-reactions in an alkaline medium is adjusted by means of the carbon dioxide partial pressure in the surrounding gas area. There are thus additional possibilities for controlling the subsequent sintering, melting and expansion processes. As a rule, the porosity of the sinter products is reduced with increasing carbon content of the intermediate product. An influence of the carbonate content on the grain inherent strength was observed.

The required intermediate product is preferably produced as a granular agglomerate from a mixture adjusted to give a doughy pasty mass. This mixture is shaped into blocks, a layer or extrusion pressings and is stored, dried or heat-treated at temperatures between 20° C. and 150° C. with preset values or profiles of the carbon dioxide and water vapour partial pressure until a sufficient green strength is obtained. The granular intermediate product is finally produced by a subsequent crushing or recrushing process and if necessary followed by autogenous rounding in a grinding drum and grading.

The heat treatment of the doughy pasty mass can be carried out advantageously by Joule heat via an ac circuit or can be accomplished advantageously using microwaves.

The process as far as the production of the intermediate product can be configured so that the agglomeration is carried out as a granulation process and if necessary is linked to a drying or heat treatment process with the carbon dioxide and water vapour partial pressures being adjusted, selected or preset as a function of time-temperature or that the agglomeration is carried out by pressing and is supplemented by recrushing and grading if necessary.

The end product as a glassy crystalline porous silicate granular material is produced from the granular intermediate product preferably in a rotary kiln process by sintering and expanding between 700° C. and 1250° C. with the addition of a parting compound mixture. In addition to high-melting MgO and CaO-rich fine-grained materials such as talc and cement, mixtures of cement and quartz fine sand can also be considered as parting compounds.

The invention is explained by two examples. It is not limited to these examples.

EXAMPLE 1

10.2 kg of powdered quartz, 85.0 kg of powdered plate glass, 2.7 kg of Portland cement, 5.4 kg of caustic soda (50%), 1.2 kg of powder sugar, 8.0 kg of bentonite and 20.0 kg of water are mixed to a doughy pasty mass and shaped into extrusion pressings 6 mm in diameter and 10 to 20 mm long in an extruder.

The extrusion pressings are transferred immediately to a drying device and are heat-treated and dried for 20 h at 130° C. with limited exchange of air (thus with reduced carbon dioxide partial pressure and increased water vapour partial pressure compared with the surrounding air). The hard pressings obtained are crushed to a length of approximately 6 mm and heated to 750° C. in 10 min in an indirectly heated rotary kiln with the addition of a parting compound mixture comprising 50 kg annealed Portland cement and 50 kg annealed fine quartz sand and in an air atmosphere, held for 10 min at a temperature of 750° C. and then cooled rapidly first to 400° C. to 300° C.

A grey expanded granular material is obtained having a dense surface and values for the bulk density between 0.28 g/cm³ and 0.31 g/cm³.

EXAMPLE 2

According to Laboratory Tests 3400 g powdered glass, 370 g powdered quartz, 40 g Grossalmerode ground unburned clay, 108 g Portland cement, 217 g caustic soda (50%), 50 g powder sugar and 1200 g water are mixed to form a dross-like pasty mass.

The pasty mass is transferred to a rectangular PTFE container. Alternating current is supplied via two stainless steel electrodes immersed at the narrow sides of the container using a variable-ratio isolating transformer. The power supplied is between 100 and 200 W. At the selected measuring point the temperatures reach 98° C. Water vapour escapes through small holes in the initially leather-like surface skin of the mass. After 2 h the current falls to zero and the heat treatment process carried out with almost no carbon dioxide being admitted and at high water vapour partial pressure is completed.

After cooling the mass is shaped into an outside dry solid block. The block is broken and then most of it is crushed to give grain fragments of 5 mm to 8 mm. At 150° C. this material has a drying loss of 18.2%, at 900° C. it has a drying loss including annealing loss of 21.4%.

Under conditions similar to those of a rotary kiln process the fragmented material is heated with cement as the parting compound to 800° C. in 10 min in an air atmosphere, then held for 10 min at a temperature of 800° C. and then cooled rapidly first to 400° C. to 300° C.

A dark grey expanded granular material is obtained having a dense surface and values for the bulk density of 0.23 g/cm$^3$.

What is claimed is:

1. A porous silicate granular material, useful as aggregate for the production of construction materials including lightweight concrete, mortar or heat-insulating plaster and containing glass and a glassy-crystalline component comprising 45 to 85 wt. % $SiO_2$, 5 to 20 wt. % alkali oxide, 5 to 30 wt. % alkaline earth oxide and 2 to 30 wt. % of other oxides selected from the group consisting of alumina, iron oxide, and mixtures thereof, whereby the glassy crystalline component accounts for 5 to 75 wt. % of the granular material, wherein the glassy crystalline component is the sinter reaction product of a mixture of quartz powder and/or another essentially pure fine-grained $SiO_2$ carrier, powdered clay and/or powdered clay mineral, Portland cement, sodium hydroxide in hydrous solution and an expanding agent as at least one additive.

2. A method for producing granular material, useful as aggregate for the production of construction materials including lightweight concrete, mortar or heat-insulating plaster and containing glass and a glassy-crystalline component comprising 45 to 85 wt. % $SiO_2$, 5 to 20 wt. % alkali oxide, 5 to 30 wt. % alkaline earth oxide and 2 to 30 wt. % of other oxides selected from the group consisting of alumina, iron oxide, and mixtures thereof, whereby the glassy crystalline component accounts for 5 to 75 wt. % of the granular material, wherein a mixture of at least powdered glass, quartz powder and/or another essentially pure fine-grained $SiO_2$ carrier, powdered clay and/or powdered clay mineral, Portland cement, sodium hydroxide in hydrous solution;

an expanding agent and as at least one additive and water is prepared, the mixture is agglomerated at a temperature of 20° C. to 150° C. at standard pressure of 101325 Pa the intermediate product is optionally crushed and graded the intermediate product thus obtained is heated at standard pressure of 101325 Pa to a temperature of 700° C. to 1250° C. and sintered and expanded at this temperature.

3. The method according to claim 2, wherein after agglomeration the mixture is put into intermediate storage and then dried and/or heat treated.

4. The method according to claim 3, wherein the mixing, agglomeration, intermediate storage, drying and/or heat treatment takes place with carbon dioxide being admitted.

5. The method according to claim 2, wherein powdered glass, quartz powder and/or another essentially pure fine-grained $SiO_2$ carrier having a grain size of <40 $\mu$m is used.

6. The method according to claim 2, wherein during preparation of the mixture silicate, oxide, hydroxide, carbonate and/or sulphate materials are added as additives.

7. The method according to claim 2, wherein during preparation of the mixture water glass solutions, filter dust, ground slag, powdered ceramic, quicklime, hydrated lime, powdered limestone, gypsum, anhydride, powdered corundum, aluminium hydrate and/or oxides, hydroxides, carbonates and sulphates of alkalis and alkaline earths are added.

8. The method according to claim 2, wherein a mass fraction of the granular material originating from additives and/or accessory agents as end product is a maximum of 20 wt. %.

9. The method according to claim 2, wherein carbon and/or carbon carriers including soot, powdered graphite, powdered coal, fine-grained silicon carbide and carbohydrate are used as swelling agents.

10. The method according to claim 2, wherein the mixture is adjusted as a doughy pasty mass and then agglomerated.

11. The method according to claim 2, wherein the mixture, especially in the form of a doughy pasty mass is subjected to heat treatment.

12. The method according to claim 11, wherein the heat treatment is provided by Joule heat via an ac power supply.

13. The method according to claim 11, wherein the heat treatment takes place by supplying microwaves.

14. The method according to claim 2, wherein the agglomeration is accomplished by a granulation process or takes place by pressing.

15. The method according to claim 2, wherein the sintering and expanding takes place in a rotary kiln with the addition of a parting compound.

* * * * *